United States Patent
Yang

[11] Patent Number: 6,123,105
[45] Date of Patent: Sep. 26, 2000

[54] VALVE FOR MIXING COLD AND HOT WATER

[76] Inventor: Tsai Chen Yang, P.O. Box 63-99, Taichung 406, Taiwan

[21] Appl. No.: 09/373,413

[22] Filed: Aug. 11, 1999

[51] Int. Cl.[7] .................................................. F16K 11/06
[52] U.S. Cl. ...................................... 137/625.41; 137/270
[58] Field of Search ............................... 137/270, 625.41; 251/288

[56] References Cited

U.S. PATENT DOCUMENTS

| | | | |
|---|---|---|---|
| 4,651,770 | 3/1987 | Denham et al. ........................ | 137/270 |
| 5,398,717 | 3/1995 | Goncze .................................... | 137/270 |
| 5,402,819 | 4/1995 | Bosio ....................................... | 137/270 |
| 5,832,952 | 11/1998 | Cook et al. ............................. | 137/270 |

*Primary Examiner*—John Fox

[57] ABSTRACT

A valve includes a housing having one or more pairs of opposite notches and one or more pairs of opposite channels. A plate has a stem rotatably engaged through the housing and has a pair of curved oblong holes. A base has two gaskets for communicating two inlets to the curved oblong holes of the plate. The base has one or more pairs of opposite juts and one or more pairs of opposite hooks engaged with the notches and the channels of the housing for allowing the housing and the plate to be rotated for 180 degrees relative to the base and to be secured to the base.

4 Claims, 4 Drawing Sheets

VALVE FOR MIXING COLD AND HOT WATER

BACKGROUND OF THE INVENTION

1. Field of the Invention

The present invention relates to a valve, and more particularly to a valve for mixing cold and hot water.

2. Description of the Prior Art

Typical valves for mixing cold and hot water comprise a first inlet coupled to a cold water reservoir and a second inlet coupled to a hot water reservoir for receiving the cold water and the hot water from the cold water reservoir and the hot water reservoir respectively. The valves further include a control mechanism for controlling the flowing and/or the mixing of the cold water and the hot water. When the first inlet is wrongly coupled to the hot water reservoir and when the second inlet is wrongly coupled to the cold water reservoir, the cold water and the hot water may be wrongly supplied into the valve such that the valve, particularly the knob of the valve may be operated in different actuation or rotation directions from that of the usual directions of the typical valves. The users may not operate the valve in the way that they typically operate the typical valves for mixing hot water and cold water.

The present invention has arisen to mitigate and/or obviate the afore-described disadvantages of the conventional water valves.

SUMMARY OF THE INVENTION

The primary objective of the present invention is to provide a valve which includes a symmetric mechanism which may be assembled according to the cold water inlet and the hot water inlet of the valve body.

In accordance with one aspect of the invention, there is provided a valve comprising a housing including at least one pair of notches oppositely formed therein, and including at least one pair of channels oppositely formed therein, the housing including a bore formed therein and including a projection extended therefrom, a plate including a pair of curved oblong holes formed therein and including a stem extended therefrom and rotatably received in the bore of the housing, a follower secured to the stem and including an extension extended therefrom for engaging with the projection of the housing and for limiting a rotational movement between the stem and the housing, a base including two hubs provided therein and including an outlet formed therein, and two gaskets received in the hubs and engaged with the plate, the base including at least one pair of juts extended therefrom and engaged into the pair of notches of the housing, and including at least one pair of hooks engaged through the pair of channels of the housing and engaged with the housing for detachably securing the base to the housing. The engagement of the opposite pair of juts and the pair of hooks into the respective opposite pair of notches and the opposite pair of channels of the housing allows the housing and the plate to be rotated for 180 degrees relative to the base and to be secured to the base.

The stem includes a first engaging member, the follower includes a second engaging member for engaging with the first engaging member of the stem and for securing the stem to the follower and for allowing the stem and the follower to be rotated in concert with each other.

A spring device is further provided for biasing the gaskets to engage with the plate. A ring is further secured to the housing and includes a stop extended therefrom for engaging with the extension of the follower and for limiting a rotational movement between the stem and the housing.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
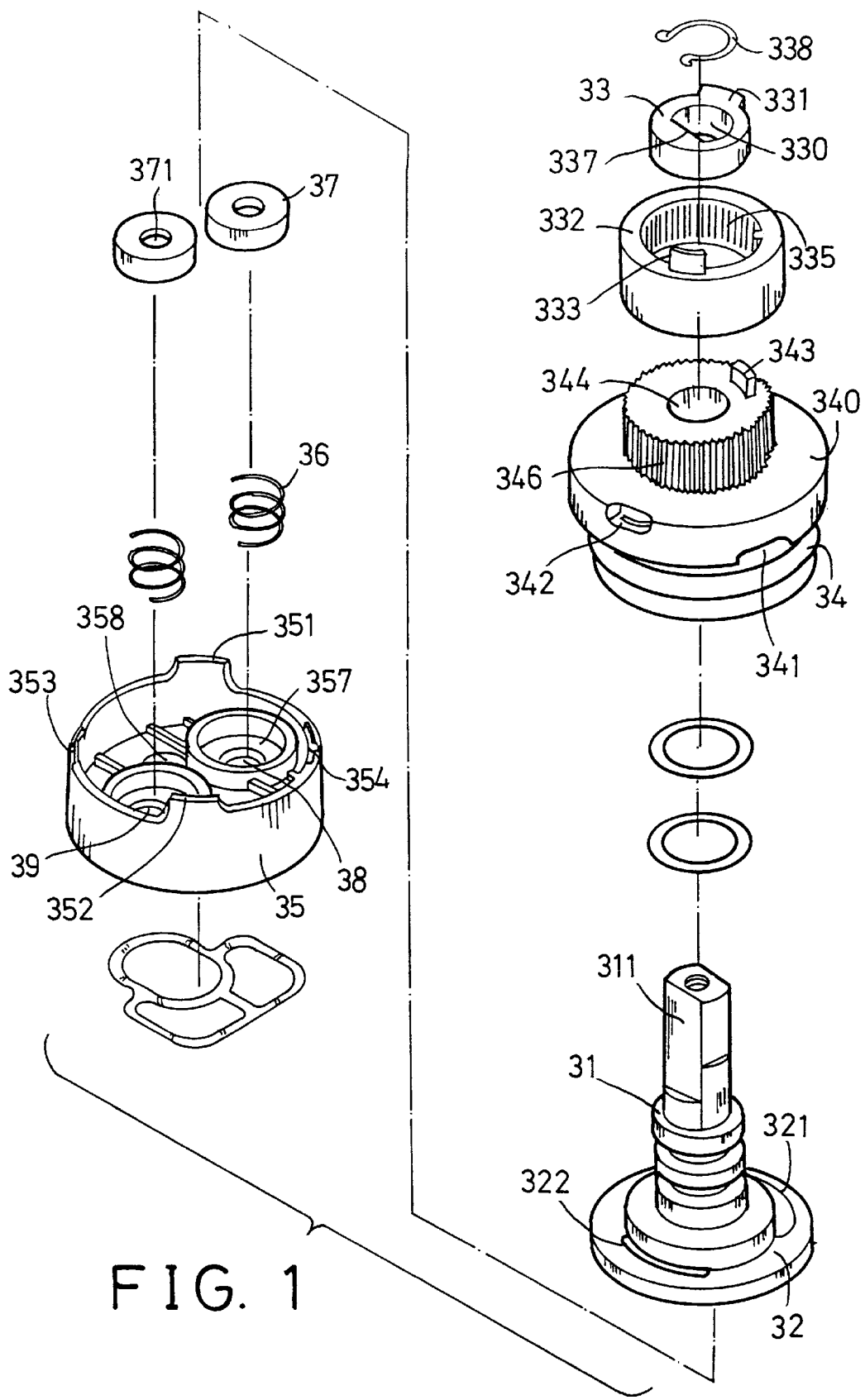
FIG. 1 is an exploded view of a valve in accordance with the present invention.
Figure 3:
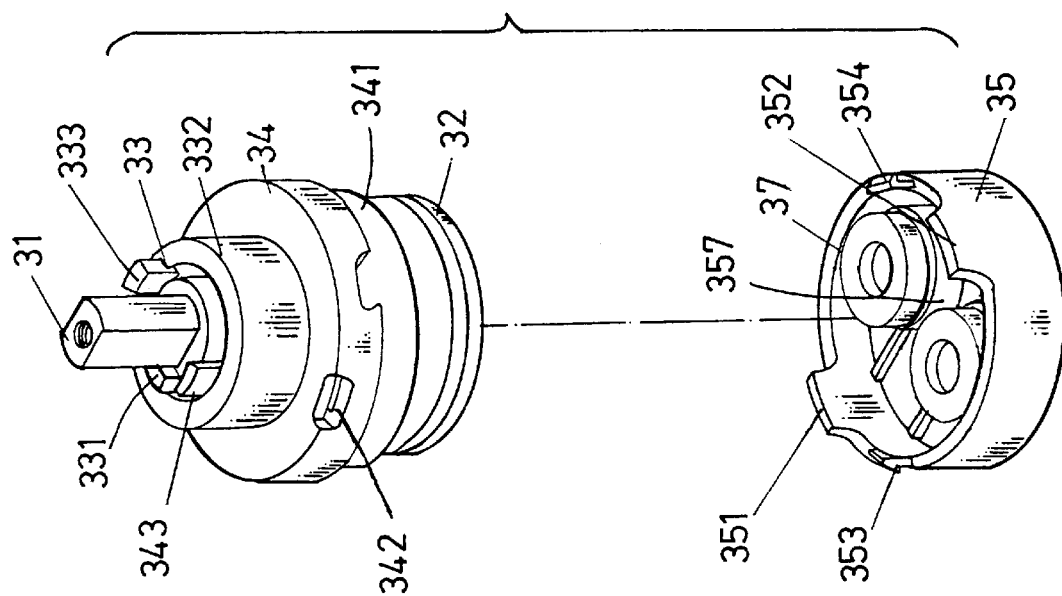
FIG. 3 is a partial exploded view of the valve, in which the upper portion of the valve is rotated for 90 degrees relative to the base.
Figure 2:
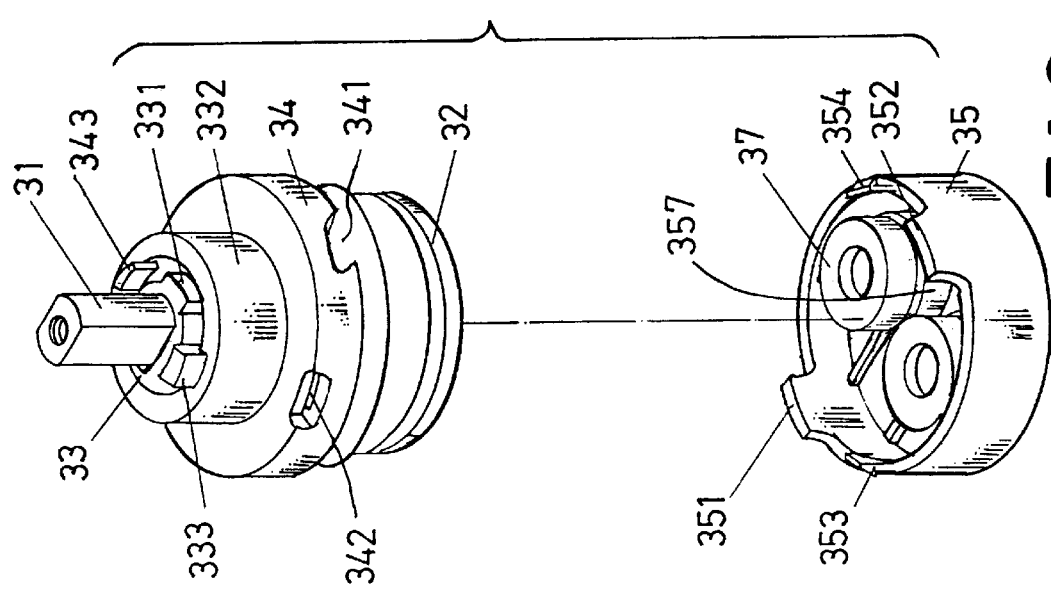
FIG. 2 is a partial exploded view of the valve, view from the front portion thereof, for example.
Figure 4:
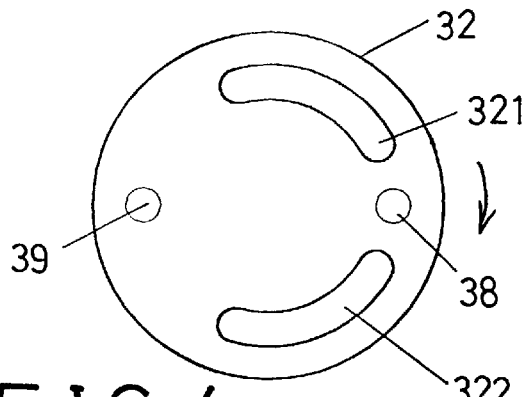
FIGS. 4, 5, 6, 7, 8, 9, 10, 11 are plane schematic views illustrating the operation of the valve.
Figure 5:
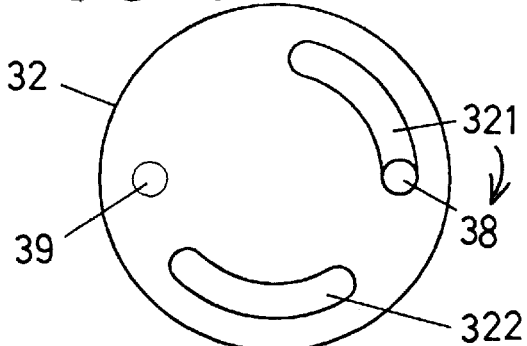

Referring to the drawings, and initially to FIGS. 1–3, a valve in accordance with the present invention comprises a housing 34 including a peripheral flange 340 extended radially outward from the middle portion thereof and including one or more pairs of notches 341 oppositely formed in the bottom portion of the peripheral flange 340 of the housing 34 and including one or more pairs of channels 342 oppositely formed therein. Two notches 341 and two channels 342 are shown in the drawings and are oppositely formed in the housing 34; i.e., the notches 341 are arranged 180 degrees apart from each other and the channels 342 are also arranged 180 degrees apart from each other. The position between the notches 341 and two channels 342 are not required to be predetermined, but may not be aligned with each other. It is preferable that the notches 341 and the channels 342 are arranged 90 degrees, but not limited to this degree, apart from each other. The housing 34 includes a bore 344 formed therein and includes a projection 343 extended upward therefrom. The housing 34 preferably includes a gear 346 formed on the upper portion thereof.

A plate 32 includes a stem 31 extended upward therefrom and rotatably engaged into the bore 344 of the housing 34 and includes a pair of curved oblong holes 321, 322 formed therein. The stem 31 includes an engaging member, such as a key or an engaging flat surface 311 formed therein. A follower 33 includes an orifice 330 formed therein for receiving the stem 31 and includes an engaging member, such as a groove for receiving the corresponding key of the stem 31 or such as another engaging flat surface 337 formed therein for engaging with the engaging flat surface 311 of the stem 31 and for allowing the follower 33 to be secured to and to be rotated in concert with the stem 31. The follower 33 includes an extension 331 extended therefrom for engaging with the projection 343 of the housing 34 and for limiting the rotational movement between the stem 31 and the housing 34. A retaining ring 338 may further be secured to the stem 31 and engaged with the follower 33 for further securing the follower 33 to the stem 31. A ring 332 includes a stop 333 extended upward therefrom and includes an internal gear 335 formed therein for engaging with the gear 346 of the housing 34 and for securing the ring 332 to the housing 34. The stop 333 of the ring 332 is slightly extended radially inward of the ring 332 and may further be provided for engaging with the extension 331 of the follower 33 and for limiting the rotational movement between the stem 31 and the housing 34. Normally, a knob is secured to the top of the stem 31 for rotating the stem 31 relative to the housing 34.

A base 35 is to be secured to a typical valve housing or the like and includes two inlets 38, 39 formed therein for coupling to a cold water reservoir and a hot water reservoir for receiving the cold water and the hot water from the cold water reservoir and the hot water reservoir respectively. The base 35 includes two hubs 357 provided therein and aligned with the inlets 38, 39 respectively. The hubs 357 of the base 35 are provided for receiving a spring 36 and a gasket 37 respectively. The gaskets 37 are biased to engage with the plate 32 by the springs 36 respectively for making a water tight seal between the gaskets 37 and the plate 32, and each includes a bore 371 formed therein for communicating with the water inlets 38, 39 respectively. The base 35 includes an outlet 358 formed therein and includes one or more pairs of juts 351, 352 extended upward therefrom for engaging into the notches 341 of the housing 34, and includes one or more pairs of hooks 353, 354 extended upward therefrom for engaging through the channels 342 of the housing 34 and for engaging with the housing 34 and for detachably securing the base 35 to the housing 34.

When either or both of the curved oblong holes 321, 322 of the plate 32 are communicating with either or both of the inlets 38, 39 (FIGS. 5–7 and 9–11), the curved oblong holes 321, 322 include a length or a size greater than that of the hubs 357 and/or of the gaskets 37 for allowing the water from the inlets 38, 39 to flow into the base 35 and flow out through the outlet 358 of the base 35 via the curved oblong holes 321, 322 of the plate 32.

It is to be noted that the pair(s) of the notches 341 and the pair(s) of the channels 342 of the housing 34 and the pair(s) of the juts 351, 352 and the pair(s) of the hooks 353, 354 of the base 35 are arranged symmetric to each other or are arranged 180 degrees apart from each other such that the housing 34 may also be rotated for 180 degrees relative to the base 35 (FIG. 3) and secured to the base 35 with the symmetric pair(s) of the notches 341 and the channels 342 of the housing 34 and the juts 351, 352 and the hooks 353, 354 of the base 35.

Figure 6:
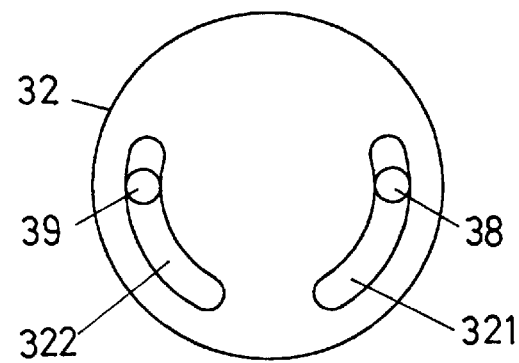
Figure 7:
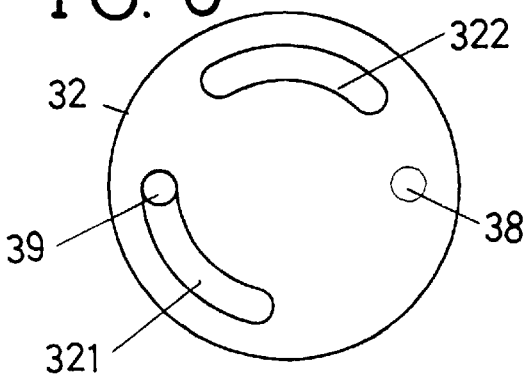
Figure 8:
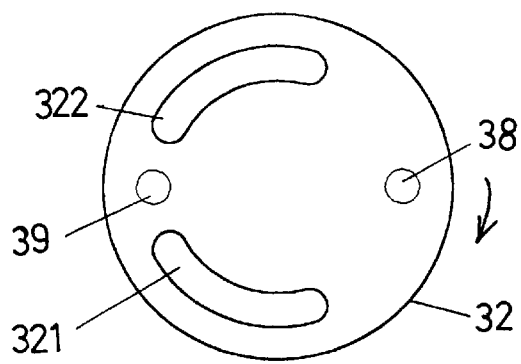

In operation, as shown in FIGS. 4–7, both the cold water and the hot water may not flow into and out through the valve when the curved oblong holes 321, 322 of the plate 32 are disengaged from the water inlets 38, 39. When the inlet 38 is coupled to the cold water reservoir and the inlet 39 is coupled to the hot water reservoir respectively, and when the plate 32 is rotated clockwise relative to the base 35, the curved oblong hole 321 is first coupled to the water inlet 38 (FIG. 5) for receiving the cold water from the cold water reservoir, such that the cold water may first flow out through the outlet 358 of the base 35. As shown in FIG. 6, when the plate 32 is further rotated clockwise relative to the base 35, the curved oblong holes 321, 322 of the plate 32 may be coupled to the water inlets 38, 39 respectively for receiving the cold water and the hot water to be mixed in the base 35 and then to flow out through the outlet 358 of the base 35. As shown in FIG. 7, when the plate 32 is further rotated clockwise relative to the base 35, the curved oblong hole 322 may be disengaged from the inlets 38, 39 and the other oblong hole 321 of the plate 32 may be coupled to the hot water inlet 39 for receiving the hot water and for allowing the hot water to flow out through the outlet 358 of the base 35.

Figure 9:
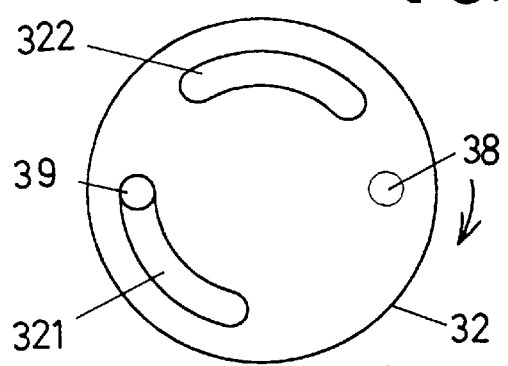
Figure 10:
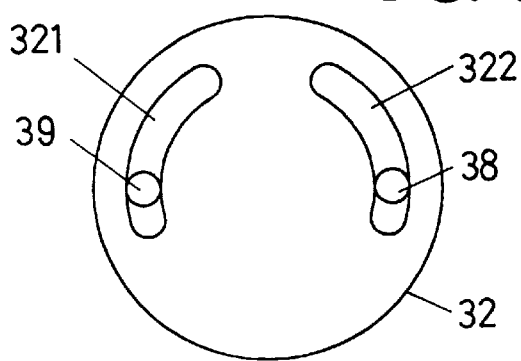
Figure 11:
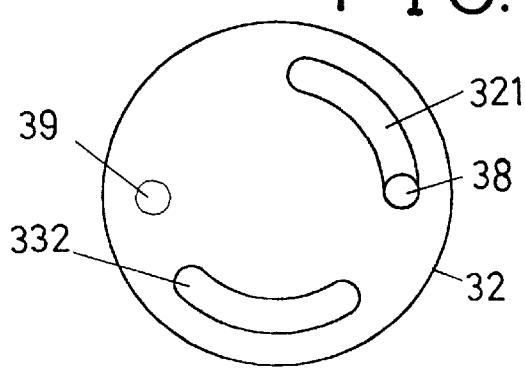

When the inlet 39 is (wrongly coupled to the cold water reservoir and the inlet 38 is (wrongly) coupled to the hot water reservoir respectively, the housing 34 and the plate 32 may be rotated for 180 degrees relative to the base 35 for allowing the curved oblong hole 321 to communicate with the cold water inlet 39 first (FIG. 9). When the plate 32 is also rotated clockwise relative to the base 35, the curved oblong hole 321 is first coupled to the water inlet 39 for receiving the cold water from the cold water reservoir, such that the cold water may also first flow out through the outlet 358 of the base 35. As shown in FIG. 10, when the plate 32 is further rotated clockwise relative to the base 35, the curved oblong holes 321, 322 of the plate 32 may be coupled to the water inlets 38, 39 respectively for receiving the cold water and the hot water to be mixed in the base 35 and then to flow out through the outlet 358 of the base 35. As shown in FIG. 11, when the plate 32 is further rotated clockwise relative to the base 35, the curved oblong hole 322 may be disengaged from the inlets 38, 39 and the oblong hole 321 of the plate 32 may be coupled to the hot water inlet 38 for receiving the hot water and for allowing the hot water to flow out through the outlet 358 of the base 35.

Accordingly, the valve in accordance with the present invention includes a symmetric mechanism which may be assembled according to the cold water inlet and the hot water inlet of the valve body.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A valve comprising:
    a housing including at least one pair of notches oppositely formed therein, and including at least one pair of channels oppositely formed therein, said housing including a bore formed therein and including a projection extended therefrom,
    a plate including a pair of curved oblong holes formed therein and including a stem extended therefrom and rotatably received in said bore of said housing,
    a follower secured to said stem and including an extension extended therefrom for engaging with said projection of said housing and for limiting a rotational movement between said stem and said housing,
    a base including two inlets formed therein and including two hubs provided therein and aligned with said inlets respectively, and including an outlet formed therein, and two gaskets received in said hubs and engaged with said plate, said base including at least one pair of juts extended therefrom and engaged into said at least one pair of notches of said housing, and including at least one pair of hooks engaged through said at least one pair of channels of said housing and engaged with said housing for detachably securing said base to said housing,
    an engagement of said opposite at least one pair of juts and said at least one pair of hooks into said respective opposite at least one pair of notches and said opposite at least one pair of channels of said housing allowing said housing and said plate to be rotated for 180 degrees relative to said base and to be secured to said base.

2. The valve according to claim 1, wherein said stem includes a first engaging member, said follower includes a second engaging member for engaging with said first engaging member of said stem and for securing said stem to said follower and for allowing said stem and said follower to be rotated in concert with each other.

3. The valve according to claim 1 further comprising means for biasing said gaskets to engage with said plate.

4. The valve according to claim 1 further comprising a ring secured to said housing and including a stop extended therefrom for engaging with said extension of said follower and for limiting a rotational movement between said stem and said housing.

\* \* \* \* \*